S. L. STOCKSTILL.
Grain Drill.
No. 24,158.
Patented May 24, 1859.
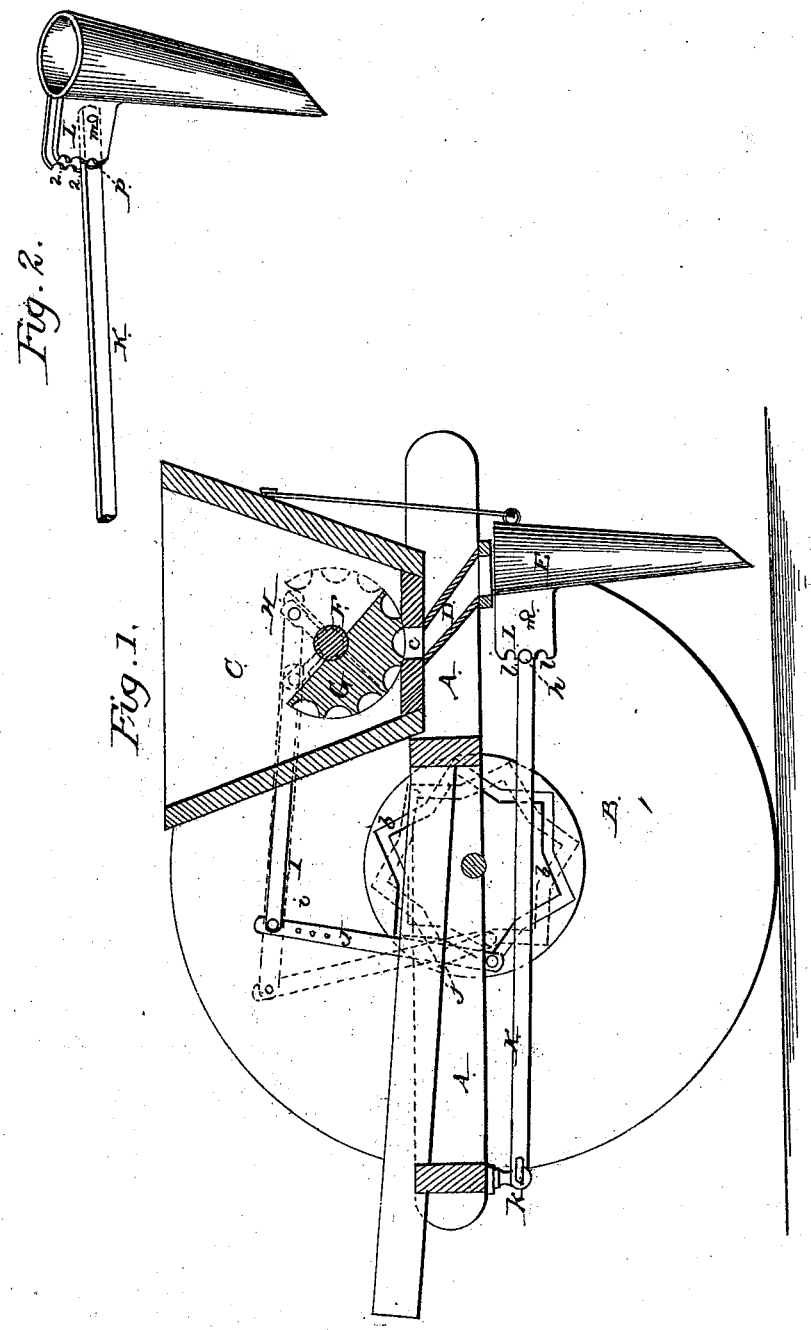

UNITED STATES PATENT OFFICE.

S. L. STOCKSTILL, OF MEDWAY, OHIO.

IMPROVEMENT IN SEED-PLANTERS.

Specification forming part of Letters Patent No. 24,158, dated May 24, 1859.

*To all whom it may concern:*

Be it known that I, STEPHEN L. STOCKSTILL, of Medway, Clarke county, Ohio, have invented new and useful Improvements in Seeding-Machines; and I hereby declare the following to be a full and exact description of the same, reference being had to the accompanying drawings, making part of this specification.

The said invention consists in an improved arrangement for adjusting the drill-tooth.

In the accompanying drawings, Figure 1 represents a vertical section of the machine parallel with the line of draft, and Fig. 2 a perspective view of the scorer and a portion of the drag-bar.

A A is the frame of the machine, supported on wheels B.

C is the seed-box, having apertures $c$ in its bottom, through which the seed flows into tubes D, by which it is conveyed to the teeth E.

F is a horizontal shaft, journaled within the seed-box and extending from end to end of the same.

G are segmental rockers mounted on the shaft F, and corresponding with the apertures $c$ in number and position. The rockers G are furnished with cavities $g$ in their peripheries, by means of which cavities the grain is forwarded to the apertures $c$ in large or small quantities, accordingly as the motion of the rocker is adjusted in extent. A simultaneous motion is imparted to the rockers by means of an arm, H, extending upward from the shaft F, and communicating by means of a rod, I, with the upper end of a lever, J, which is pivoted to the frame of the machine at $j$, and provided at its lower end with a stud, which engages in a suitable zigzag groove, $b$, in the drive-wheel B. The delivery of seed is regulated in extent by connecting the rod I with either of the holes $i$ in the lever J which may be desired.

K are the drag-bars, attached at $k$ to the frame of the machine, and at their rear ends pivoted at $m$ between cheeks or jaws L, attached to the upper part of the teeth or scorers E. The front part of the jaws L is in the form of an arc concentric with the pivot $m$, and is furnished with notches $l$, which are consequently equidistant from the pivot $m$. The drag-bar is furnished with a hole corresponding in position with the notches $l$, in which hole a wooden pin, $p$, being inserted, engages with one or other of the notches $l$, and thereby firmly holds the tooth E at any desired angle with the drag-bar. This arrangement affords a method of adjusting the angle of the teeth E with greater facility than any other plan of permanent adjustment with which I am acquainted.

The pin $p$ is made of wood, in order that it may give way in the event of any strain occurring, which would otherwise result in serious damage to the machine.

I am aware that drill-teeth have been constructed with cheeks or flanges perforated concentrically with the pivot of the drag-bar, so as to correspond with a common perforation in the said drag-bar. The superiority of my device over such consists partly in the ease of constructing the tooth by casting, but chiefly in the great facility with which it may be adjusted.

I claim as new and of my invention and desire to secure by Letters Patent—

The described arrangement of the open notches $l\ l\ l$, pivot $m$, drag-bar K, and pin $p$, the whole being constructed in the manner and for the purpose set forth.

In testimony of which invention I hereunto set my hand.

S. L. STOCKSTILL.

Attest:
JAMES STOCKSTILL,
F. P. CUPPY.